US012644533B2

(12) United States Patent
Wang et al.

(10) Patent No.: US 12,644,533 B2
(45) Date of Patent: Jun. 2, 2026

(54) TANDEM GAS VALVE

(71) Applicant: Qi'an Chen, Rui'an (CN)

(72) Inventors: Xuesheng Wang, Rui'an (CN); Qi'an Chen, Rui'an (CN)

(73) Assignee: Qi'an Chen, Rui'an (CN)

( * ) Notice: Subject to any disclaimer, the term of this patent is extended or adjusted under 35 U.S.C. 154(b) by 15 days.

(21) Appl. No.: 18/928,418

(22) Filed: Oct. 28, 2024

(65) Prior Publication Data

US 2026/0117886 A1 Apr. 30, 2026

(51) Int. Cl.
F16K 31/06 (2006.01)
F16K 1/44 (2006.01)

(52) U.S. Cl.
CPC .......... F16K 31/0679 (2013.01); F16K 1/443 (2013.01)

(58) Field of Classification Search
CPC .............................. F16K 1/443; F16K 31/0679
See application file for complete search history.

(56) References Cited

U.S. PATENT DOCUMENTS 3,108,777 A * 10/1963 Ray ..................... F16K 31/0689
251/129.01
4,475,711 A * 10/1984 Rountry ................... F16K 1/36
251/86
5,199,456 A * 4/1993 Love ....................... F23N 1/005
251/367
8,814,131 B2 * 8/2014 Lee ......................... F23N 1/005
251/86

* cited by examiner

*Primary Examiner* — Eric Keasel
(74) *Attorney, Agent, or Firm* — Westbridge IP LLC

(57) ABSTRACT

A tandem gas valve includes a valve body, a first solenoid valve and a second solenoid valve. An inlet passage, a first chamber, a second chamber, a third chamber and an outlet passage are successively provided on the valve body along a gas flow path, a first valve seat is provided between the first chamber and the second chamber, and a second valve seat is provided between the third chamber and the outlet passage. Upper ends of the first valve seat and the second valve seat are respectively provided with a sealing rib and inclined surfaces located at both sides of the sealing rib, an upper end face of the valve body is provided with first openings at positions corresponding to the first valve seat and the second valve seat, and the two solenoid valves are arranged corresponding to the first openings.

9 Claims, 14 Drawing Sheets

TANDEM GAS VALVE

TECHNICAL FIELD

The present application relates to the technical field of engine gas control devices, and particular to a tandem gas valve.

BACKGROUND

A gas engine is a power machine working on gas as a fuel, and usually has a pipeline for supplying the gas. A gas valve needs to be mounted on the pipeline to open or close the pipeline. Existing gas valves are of a single valve structure, and when they fail, the pipeline cannot be cut off in time to interrupt gas supply, resulting in low safety and poor sealing.

SUMMARY

An object of the present application is to overcome the deficiencies of the prior art, and the present application provides a tandem gas valve with a tandem structure, high safety and good sealing performance.

Technical solution of the present application is as follows.

A tandem gas valve includes a valve body, a first solenoid valve and a second solenoid valve, where an inlet passage, a first chamber, a second chamber, a third chamber and an outlet passage are successively provided on the valve body along a gas flow path, a first valve seat is provided between the first chamber and the second chamber, and a second valve seat is provided between the third chamber and the outlet passage.

Upper ends of the first valve seat and the second valve seat are respectively provided with a sealing rib and inclined surfaces located at both sides of the sealing rib, an upper end face of the valve body is provided with first openings at positions corresponding to the first valve seat and the second valve seat, the two solenoid valves are arranged corresponding to the first openings, a piston rod is movably provided in the first solenoid valve, an end portion of the piston rod is connected with a sealing gasket, and an upper end face of the sealing gasket is provided with a pressure plate.

A structure of the second solenoid valve is the same as that of the first solenoid valve; a concave cavity is provided at a middle position of the sealing gasket; an elastic piece with a hole in the middle is provided on an inner side wall of the concave cavity along a circumferential direction thereof, and the elastic piece divides the concave cavity into a movable cavity and a connecting cavity; a lower end portion of the piston rod is provided with a limiting block which is limited to the connecting cavity, and a lower end face of the limiting block is arranged in an arc shape; the piston rod is sheathed with a return spring; and when the solenoid valve is powered off, the sealing gasket is in contact with the sealing rib under the action of the return spring to close the first valve seat and the second valve seat, and when the solenoid valve is energized, the sealing gasket is separated from the sealing rib under the action of the piston rod to open the first valve seat and the second valve seat.

With the technical solution described above and adopting the tandem structure, the first sealing gasket and the second sealing gasket are respectively driven to be opened by the independent first solenoid valve and second solenoid valve, and the sealing gaskets are configured to open or close the valve seat; after the corresponding solenoid valve is powered off, the spring pushes the corresponding sealing gasket to move downward to block the valve seat, resulting in high degree of safety redundancy; the fit between the sealing rib and the sealing gasket results in good sealing performance; the pressure plate is arranged on the sealing gasket, so that the acting force of the return spring acts on the pressure plate which is subject to uniform force, ensuring the sealing performance between the sealing gasket and the sealing rib, and avoiding an outer periphery of the sealing gasket from upwarping, which solves the problem of gas leakage caused by a gap between the sealing gasket and the valve seat as a result of downward depression of the middle portion and the upwarping of the outer periphery of the sealing gasket due to uneven direct force of the return spring on the sealing gasket in the prior art.

Meanwhile, the piston rod is movably connected with the sealing gasket, and the lower end face of the limiting block is arranged in the arc shape, which facilitate adjustment of the sealing gasket; when the sealing gasket moves towards the valve seat, a deviation will easily occur during movement of the sealing gasket due to the acting force of the return spring, failing to ensure complete sealing between the sealing gasket and the valve seat; therefore, the bottom of the limiting block is improved, so that the sealing gasket can be adjusted in real time, resulting in good sealing performance between the sealing gasket and the valve seat.

A further arrangement of the present application is as follows. A positioning boss is provided at the middle position of the sealing gasket, the pressure plate is sheathed on an outer periphery of the positioning boss, an annular sleeve with a small top and a large bottom is provided on the pressure plate, and an upper end face of the annular sleeve is arranged lower than an upper end face of the positioning boss.

With the further arrangement described above, the pressure plate does not fully cover the sealing gasket, which facilitates the connection of the sealing gasket with the piston rod, but does not affect the action of the pressure plate on the sealing gasket, and the annular sleeve is arranged to have the small top and the large bottom to press the elastic piece inward to avoid the limiting block from being separated from the connecting cavity.

A still further arrangement of the present application is as follows. An inclined transition surface is provided between an inner side wall of the movable cavity and the elastic piece.

With the still further arrangement described above, the movable cavity has a space for the piston rod to move, and there is a short contact surface between the piston rod and the elastic piece, which is convenient for angle adjustment of the piston rod relative to the sealing gasket.

A more still further arrangement of the present application is as follows. A lower end portion of the return spring is sheathed outside the annular sleeve.

The more still further arrangement described above results in good stability, so that the sealing gasket is better driven to move downward to close the first valve seat and the second valve seat.

A more still further arrangement of the present application is as follows. The sealing rib has a width of 0.25 mm to 0.4 mm.

With the more still further arrangement described above, too narrow sealing rib can easily cause damage to the sealing gasket, and too wide sealing rib will affect the sealing effect, therefore, the width of the sealing rib is in the range of 0.25 mm to 0.4 mm, which will neither damage the sealing gasket nor affect the sealing effect.

A more still further arrangement of the present application is as follows. The tandem gas valve further includes a fixing seat in sealing fit with the valve body, where the first solenoid valve and the second solenoid valve are fixedly arranged on the fixing seat by bolts, a second opening is provided on the fixing seat at a position corresponding to the first opening, the piston rod passes in and out of the second opening, a sealing groove is provided on an outer periphery of the valve body located at the first opening, and a sealing ring is provided in the sealing groove to form the sealing fit between the valve body and the fixing seat.

The more still further arrangement described above facilitates mounting of the solenoid valve and results in stable structure thereof, and the arrangement of the sealing groove and the sealing ring enables good sealing performance between the fixing seat and the valve body, thus avoiding gas leakage.

A more still further arrangement of the present application is as follows. The tandem gas valve further includes a silencing pad, an upper end face of the piston rod is provided with an accommodating cavity, the silencing pad is arranged in the accommodating cavity, a magnetic core in fit with the accommodating cavity is provided in the solenoid valves, and when the piston rod is attracted under the action of an electromagnetic field force, the magnetic core is located in the accommodating cavity and is arranged to abut against the silencing pad.

The more still further arrangement described above plays a silencing role, and is also beneficial to improve the voltage released by the solenoid valve, resulting in high safety.

A more still further arrangement of the present application is as follows. A third sealing gasket is provided between the solenoid valves and the fixing seat, a third through hole is provided on the third sealing gasket at a position corresponding to the second opening, positioning grooves are provided on both opposite side edges of the third sealing gasket, positioning edges are correspondingly provided on the solenoid valves, and the positioning edges are located in the corresponding positioning grooves.

With the more still further arrangement described above, there is a tight structure between the solenoid valve and the fixing seat, resulting in good sealing performance and avoiding gas leakage from the gap between the solenoid valve and the fixing seat; the end portion of the bolt passes through the solenoid valve and the third sealing gasket, and fits with the mounting hole on the fixing seat to achieve fixed mounting; and the bolt passes through the third sealing gasket, so that the third sealing gasket has a firm structure and good stability.

A more still further arrangement of the present application is as follows. The tandem gas valve further includes a lower cap, where a lower end face of the valve body is provided with a third opening at a position corresponding to the third chamber, the lower cap includes a connecting plate and a tab, the connecting plate is fixedly connected with the valve body by a bolt, and a fourth sealing gasket is provided between the lower cap and an end face of the third opening, and the tab extends through the third opening into the third chamber.

With the more still further arrangement described above, the third opening is arranged to facilitate die-casting of the valve body; the tab on the lower cap extends into the third chamber, which can reduce volume of the third chamber and is beneficial to reduce the gas stored in the third chamber; the fourth sealing gasket is arranged between the lower cap and the valve body, so that the third chamber has good sealing performance, preventing gas from flowing out; the connecting plate is fixedly connected with the valve body by the bolt, so that the lower cap is easy to be dismounted and mounted and has a firm structure; and an upper end face of the tab is provided with an arc-shaped portion.

DETAILED DESCRIPTION OF THE EMBODIMENTS

The technical solutions of the embodiments of the present application will be described clearly and completely below with reference to the accompanying drawings, and it is obvious that the embodiments described are only some, instead of all, of the embodiments of the present application. All other embodiments obtained by a person of ordinary skill in the art based on the embodiments of the present application without creative efforts fall within the protection scope of the present application.

It should be noted that all directional indications in the description of the present application are only used to explain relative positional relationships between components in a specific posture, and if the specific posture changes, the directional indication will also change accordingly.

In addition, descriptions such as "first", "second", etc., in the present application are only for descriptive purposes, and cannot be construed as indicating or implying their relative importance or implicitly indicating the number of indicated technical features. In the description of the present application, "a plurality of" means at least two, such as two, three, etc., unless otherwise specifically defined.

In addition, technical solutions in various embodiments of the present application may be combined with each other, but must be realized by a person skilled in the art, and when the combination of technical solutions is contradictory or cannot be realized, it should be considered that such a combination of technical solutions does not exist and is not within the protection scope claimed in the present application.

Figure 1:
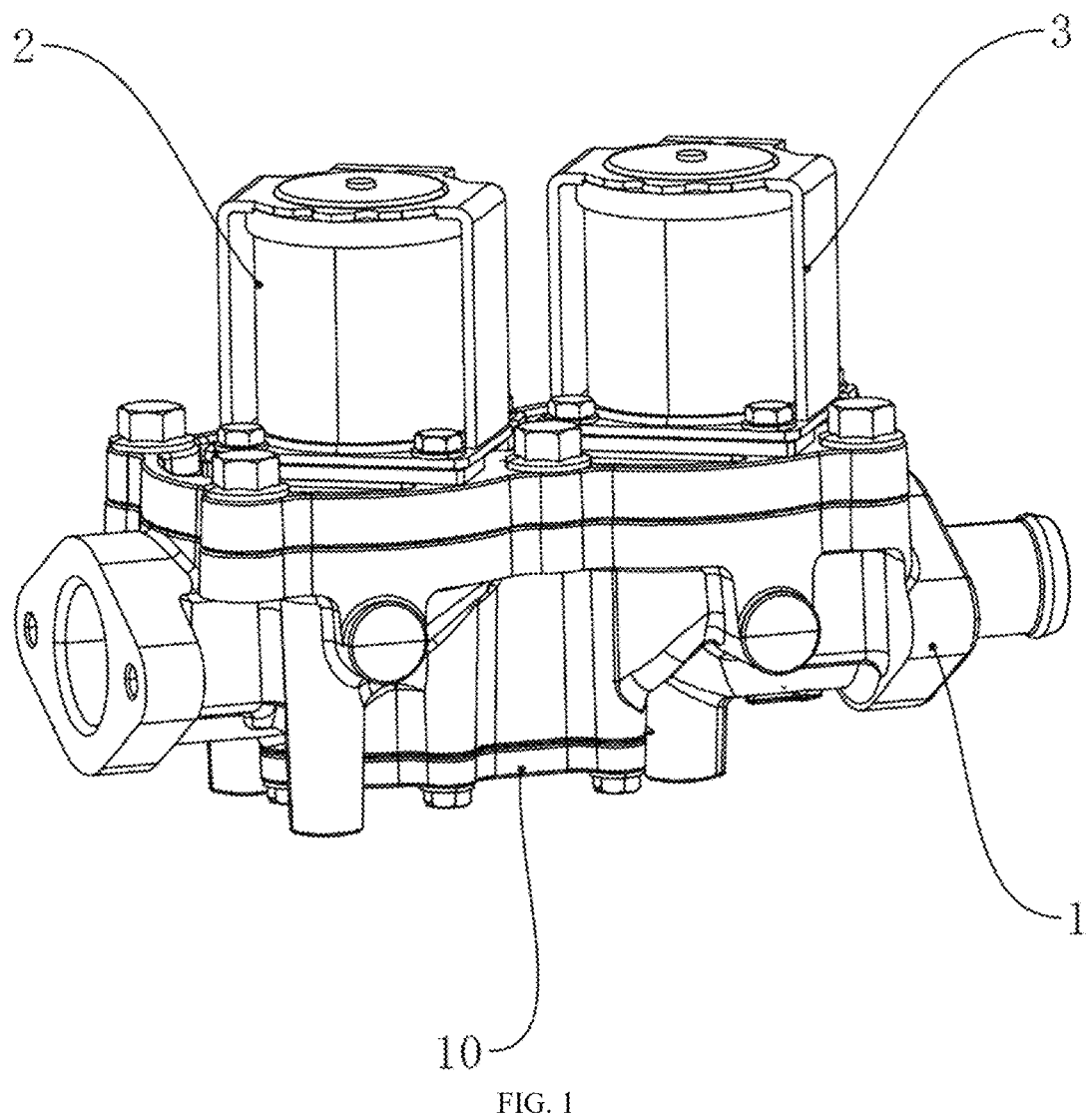
FIG. 1 is an exploded schematic view of an overall structure according to a specific embodiment of the present application.
Figure 2:
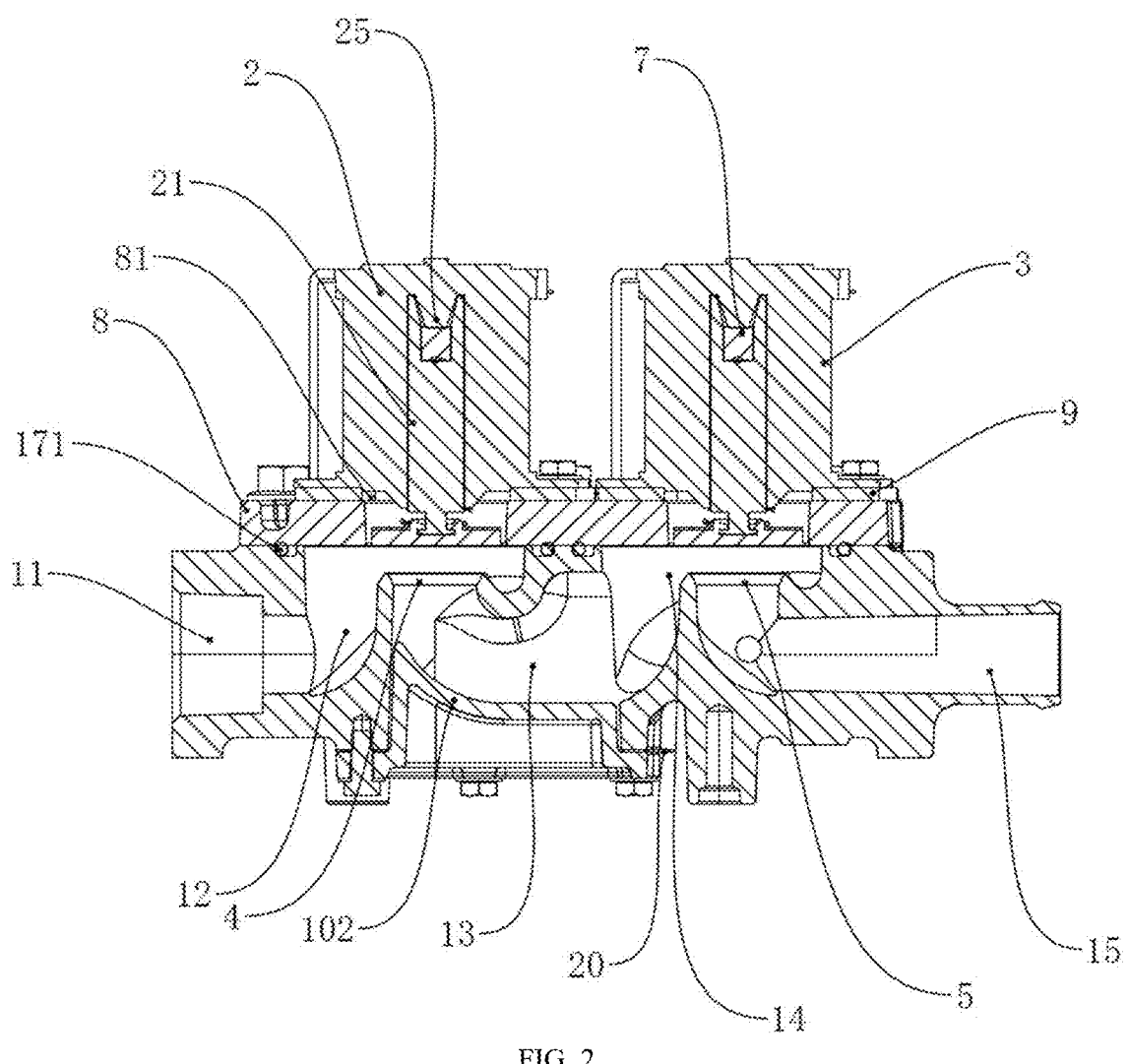
FIG. 2 is a sectional view of a specific embodiment of the present application.
Figure 3:
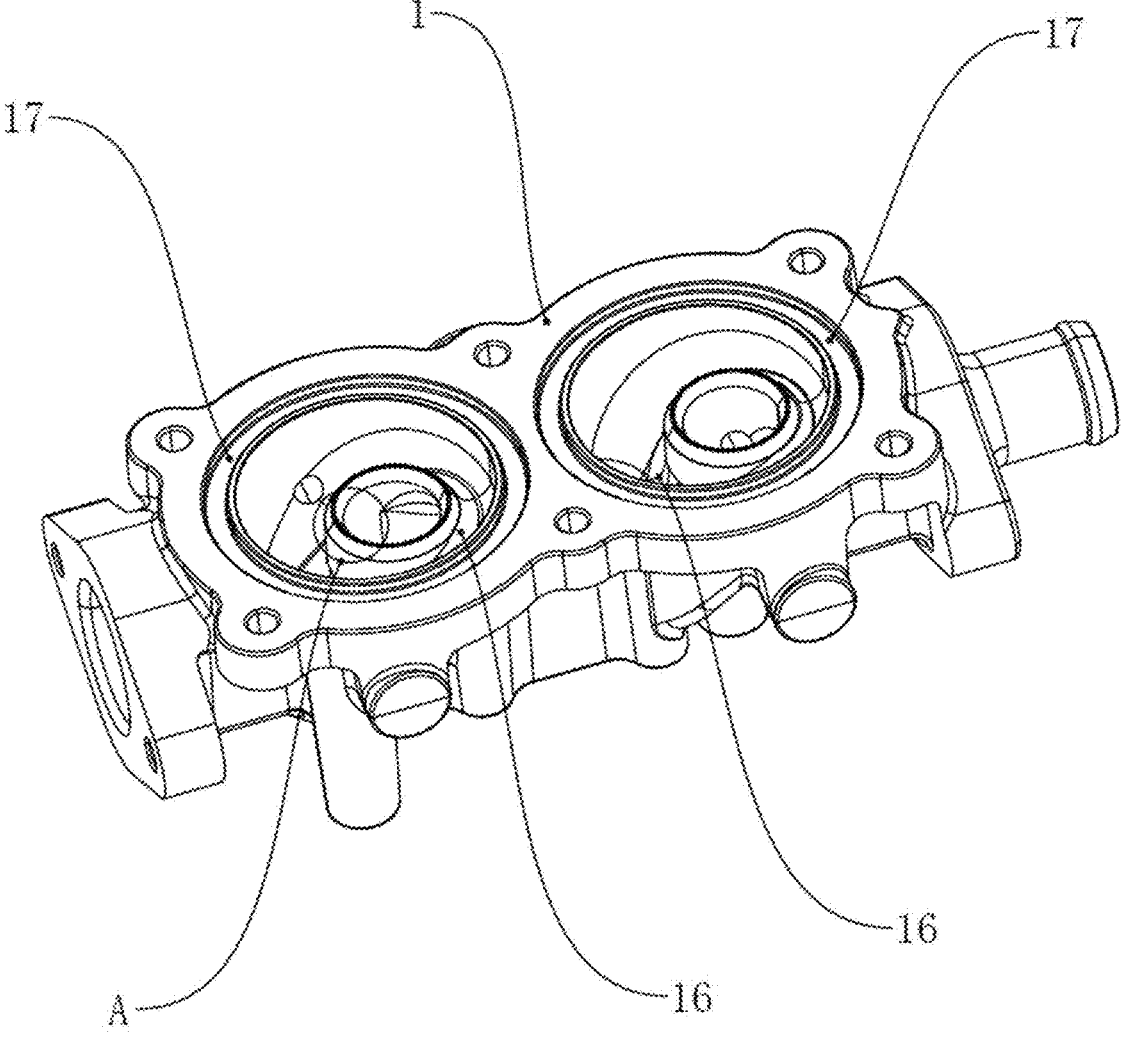
FIG. 3 is a schematic view of a valve body according to a specific embodiment of the present application.
Figure 4:
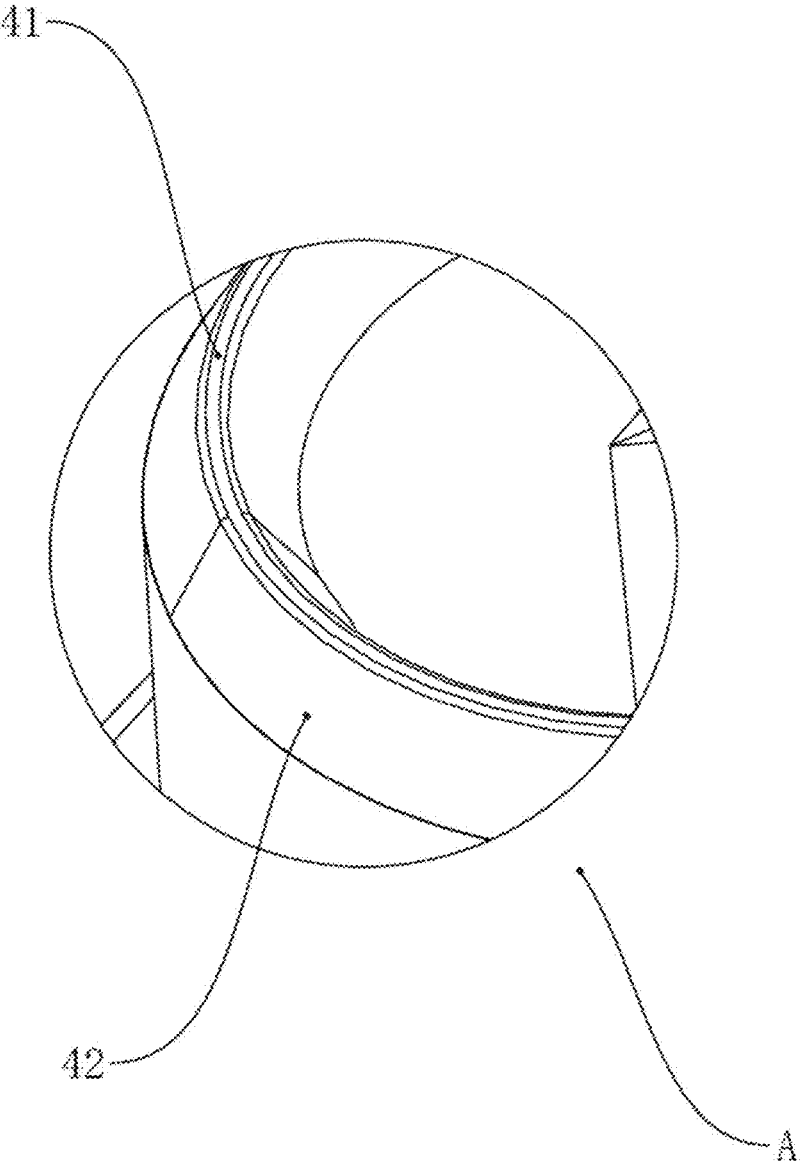
FIG. 4 is an enlarged view of portion A in FIG. 3.
Figure 5:
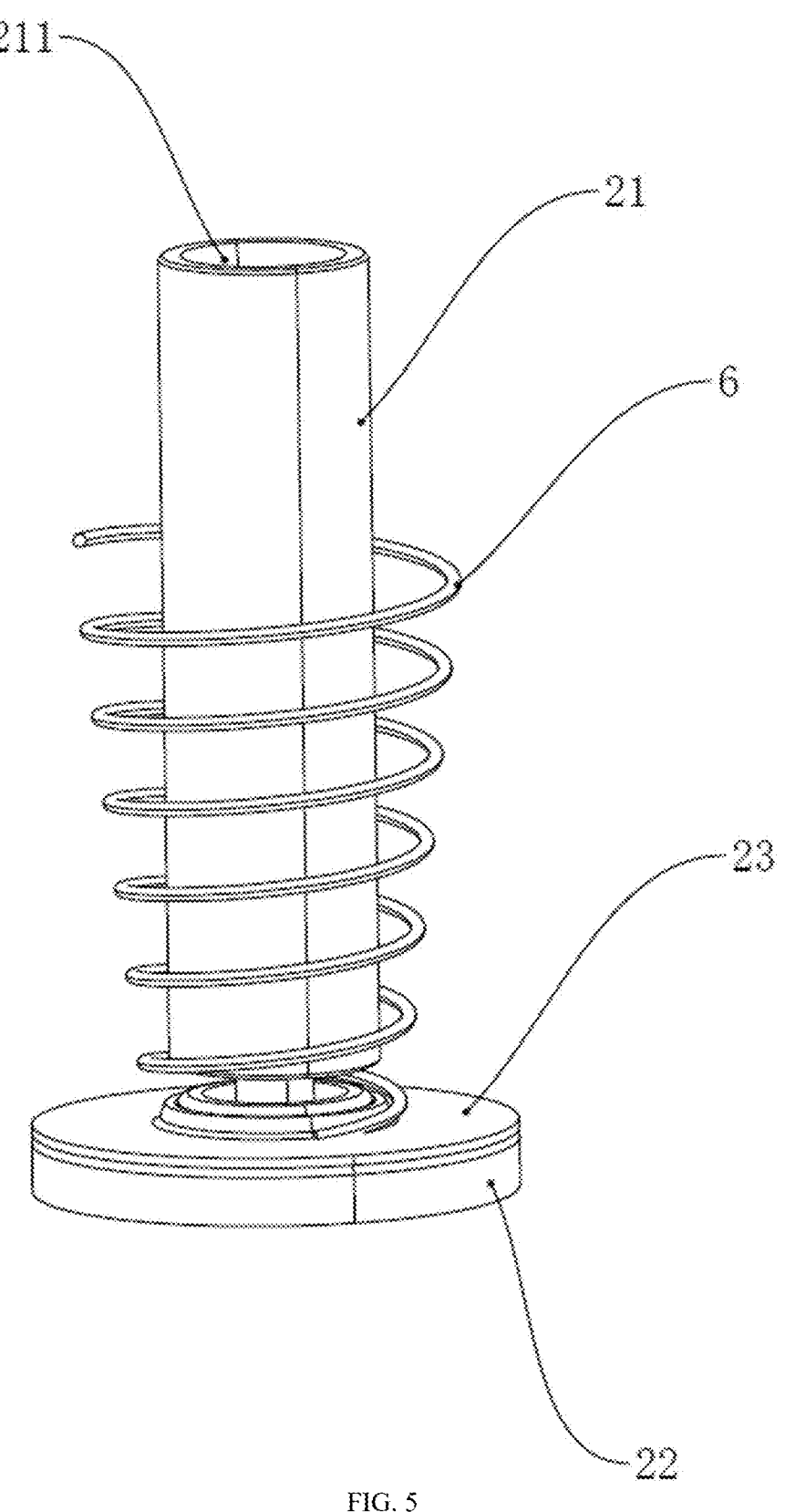
FIG. 5 is a schematic view of a connection between a first piston rod and a first sealing gasket according to a specific embodiment of the present application.
Figure 6:
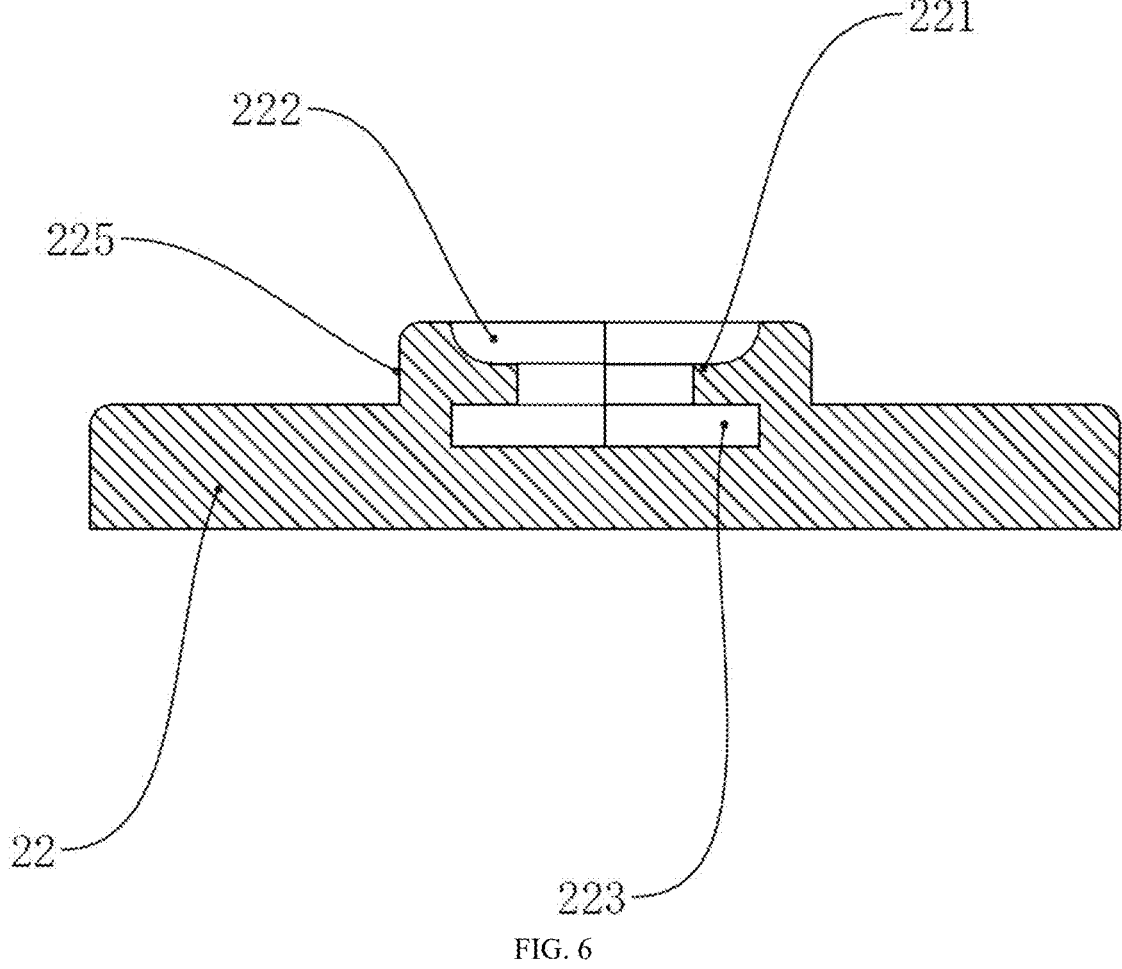
FIG. 6 is a sectional view of a first sealing gasket according to a specific embodiment of the present application.
Figure 7:
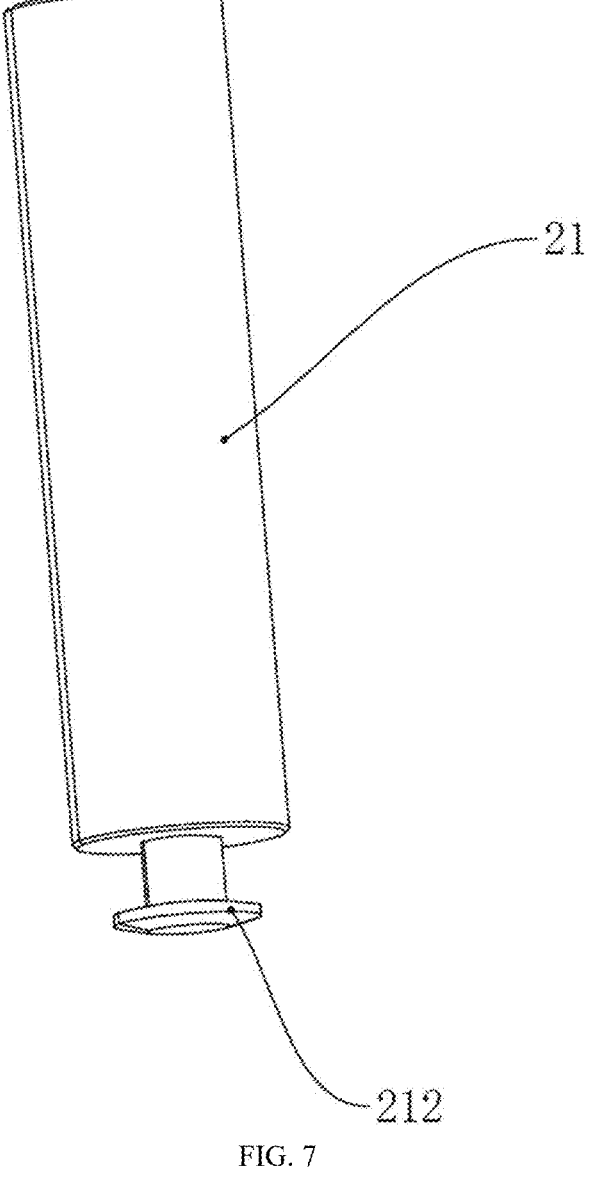
FIG. 7 is a schematic view of a first piston rod according to a specific embodiment of the present application.
Figure 8:
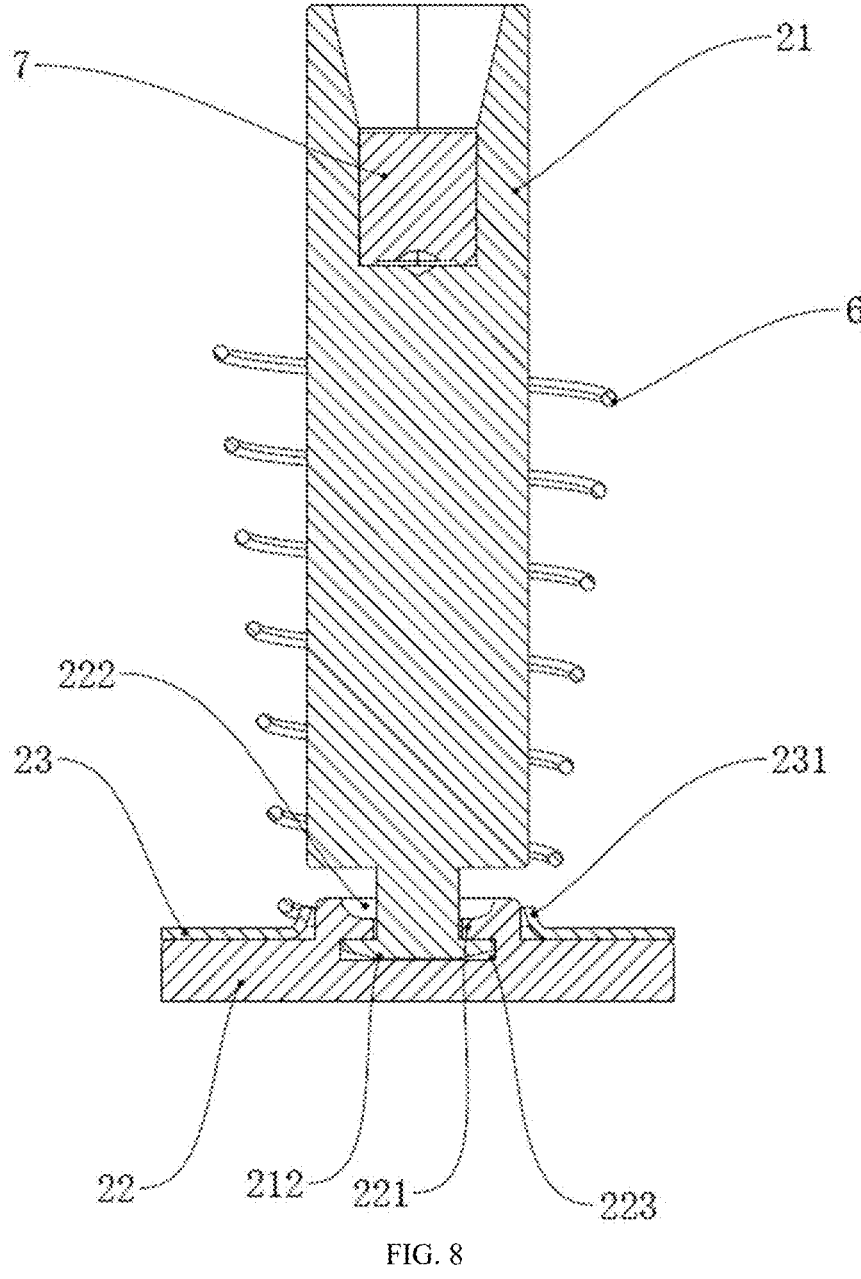
FIG. 8 is a sectional view of a first piston rod and a first sealing gasket according to a specific embodiment of the present application.
Figure 9:
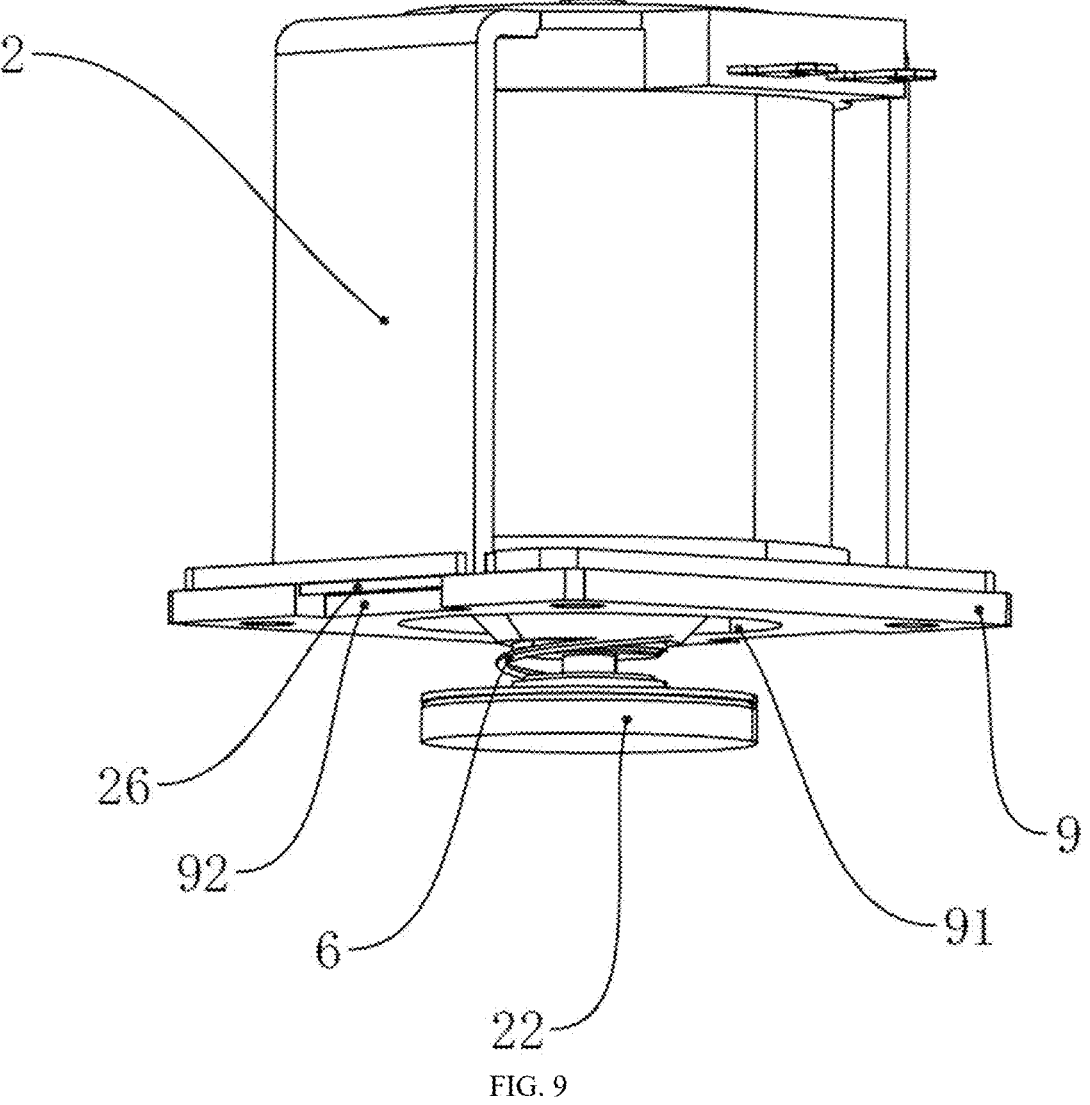
FIG. 9 is a schematic view of a first solenoid valve and a third sealing gasket according to a specific embodiment of the present application.
Figure 10:
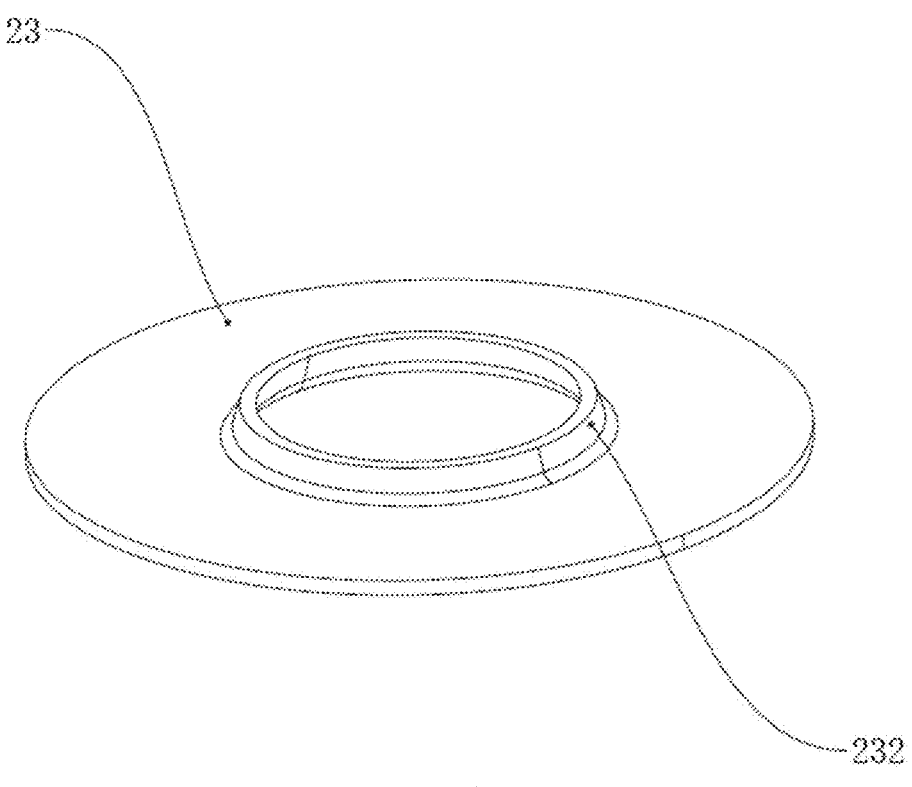
FIG. 10 is a schematic view of a first pressure plate according to a specific embodiment of the present application.
Figure 11:
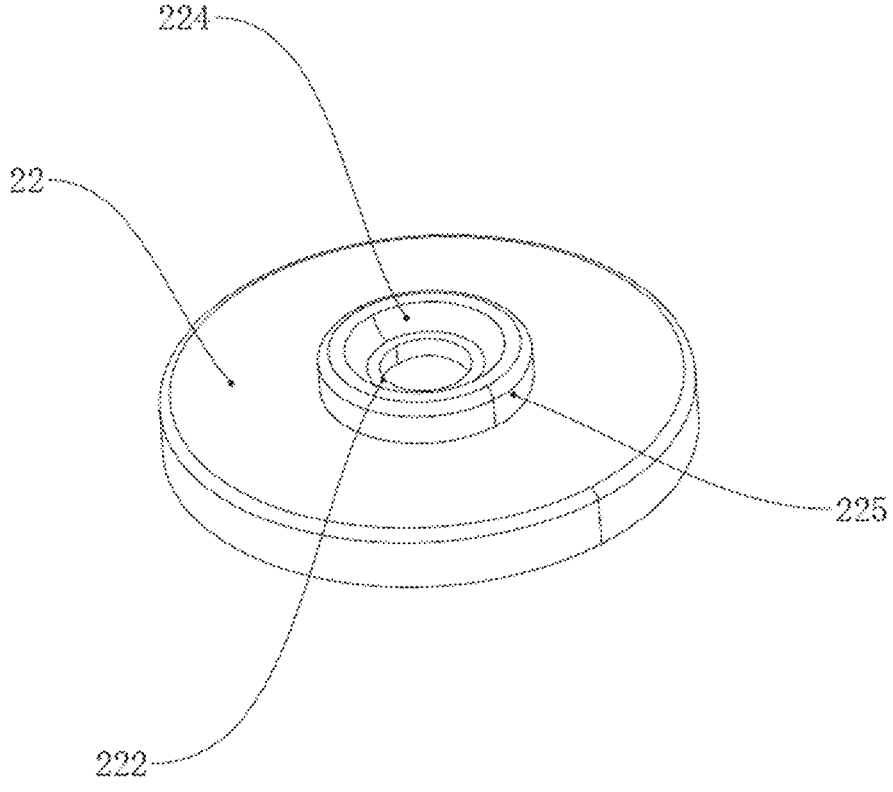
FIG. 11 is a schematic view of a first sealing gasket according to a specific embodiment of the present application.
Figure 12:
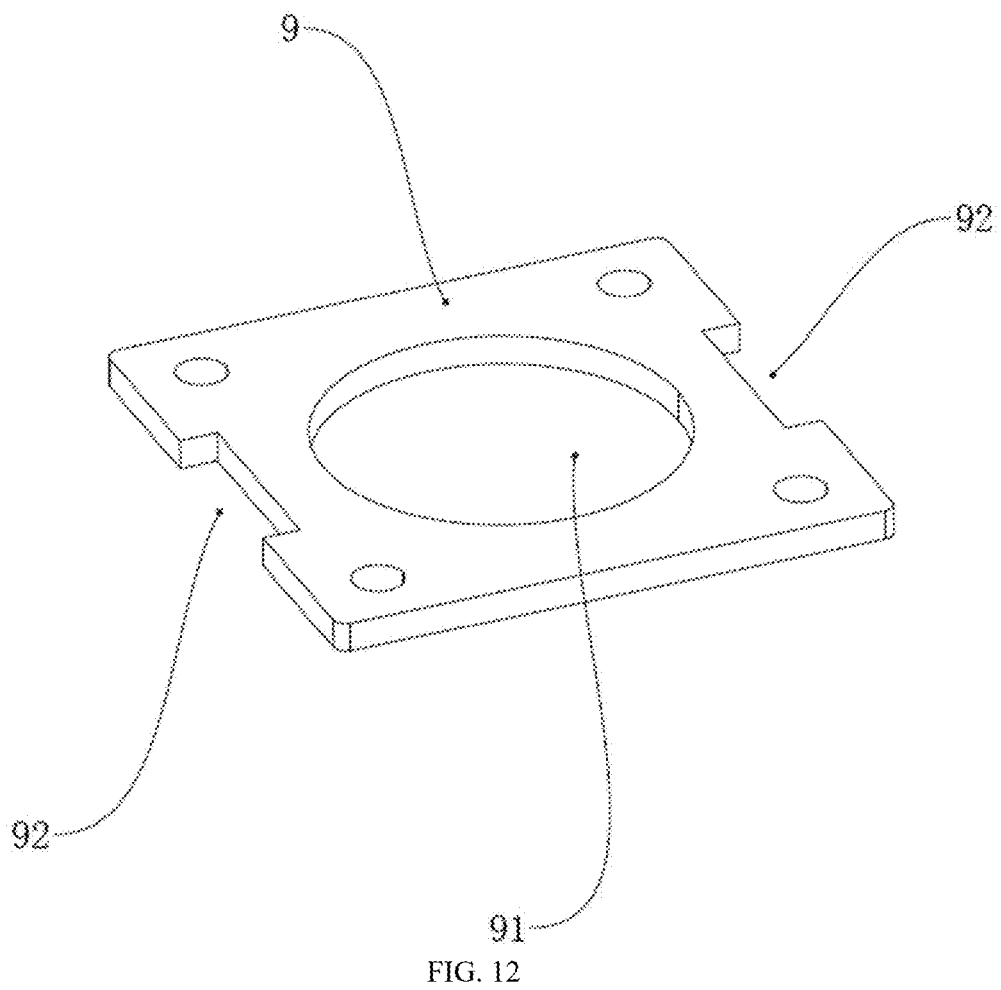
FIG. 12 is a schematic view of a third sealing gasket according to a specific embodiment of the present application.
Figure 13:
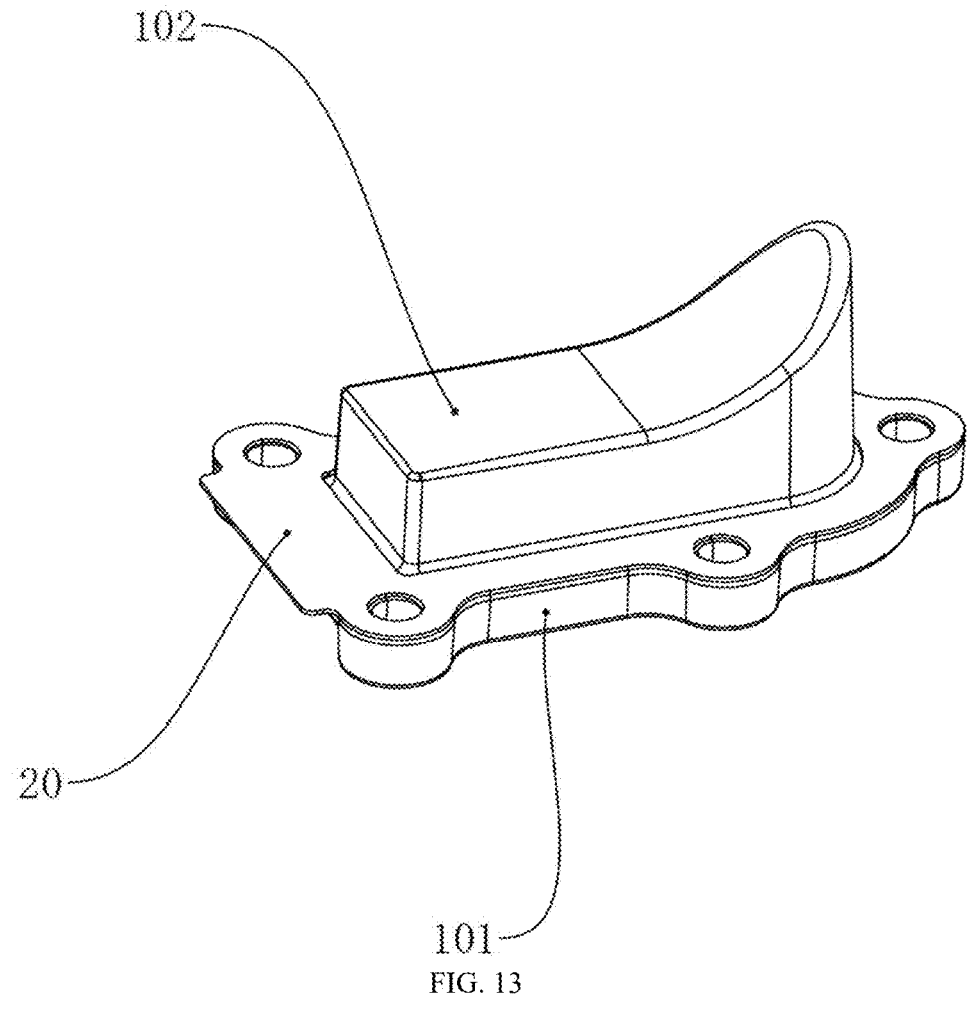
FIG. 13 is a schematic view of a lower cap according to a specific embodiment of the present application.
Figure 14:
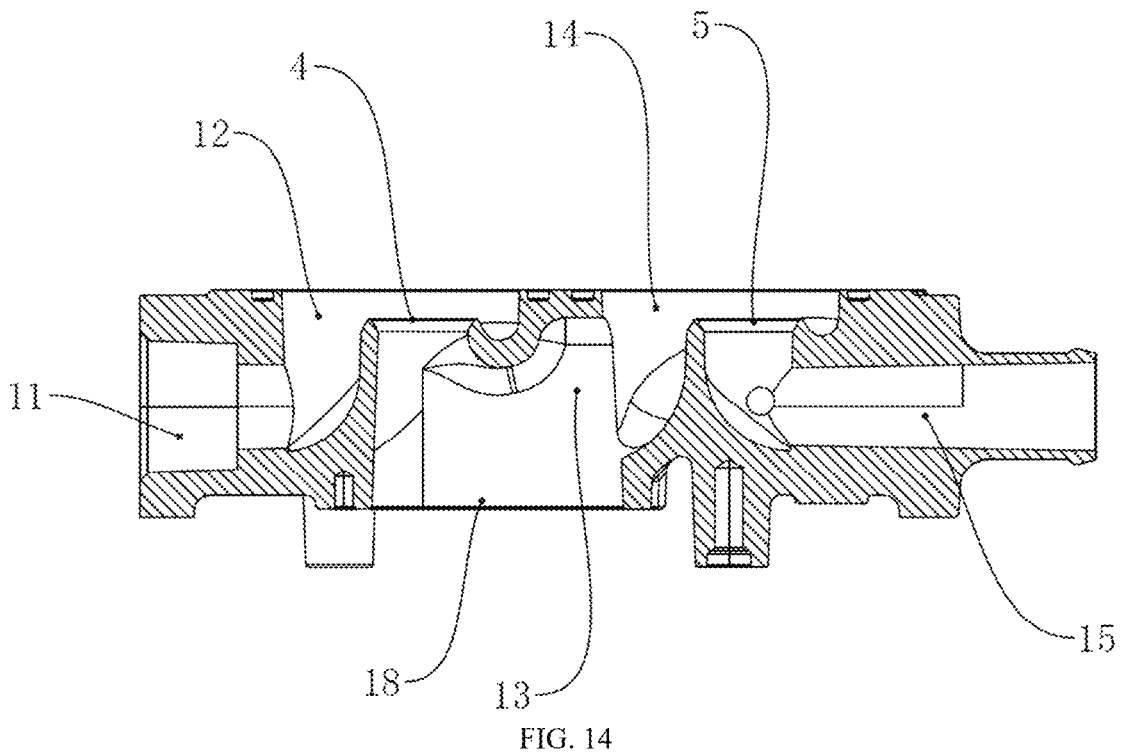
FIG. 14 is a sectional view of a valve body according to a specific embodiment of the present application.

As shown in FIGS. 1-14, a tandem gas valve includes a valve body 1, a first solenoid valve 2 and a second solenoid valve 3, where the two solenoid valves are 12 V solenoid valves, an acting force thereof is 5 N, and a gas pressure is 0.9 kPa to 3.5 kPa.

An inlet passage 11, a first chamber 12, a second chamber 13, a third chamber 14 and an outlet passage 15 are successively provided on the valve body 1 along a gas flow path; a first valve seat 4 is provided between the first chamber 12 and the second chamber 13, and a second valve seat 5 is provided between the third chamber 14 and the outlet passage 15.

Upper ends of the first valve seat 4 and the second valve seat 5 are respectively provided with a sealing rib 41 and inclined surfaces 42 located at both sides of the sealing rib 41; an upper end face of the valve body 1 is provided with first openings 16 at positions corresponding to the first valve seat 4 and the second valve seat 5, and the two solenoid valves are arranged corresponding to the first openings 16; a piston rod 21 is movably provided in the first solenoid valve 2, an end portion of the piston rod 21 is connected with a sealing gasket 22, and an upper end face of the sealing gasket 22 is provided with a pressure plate 23.

A structure of the second solenoid valve 3 is the same as that of the first solenoid valve 2, so detailed description will not be made; a concave cavity is provided at a middle position of the sealing gasket 22; an elastic piece 221 with a hole in the middle is provided on an inner side wall of the concave cavity along a circumferential direction thereof, and an aperture of the hole on the elastic piece is more than a diameter of the piston rod located in the concave cavity; the elastic piece 221 divides the concave cavity into a movable cavity 222 and a connecting cavity 223; a lower end portion of the piston rod 21 is provided with a limiting block 212 which is limited to the connecting cavity 223, and a lower end face of the limiting block 212 is arranged in an arc shape; the piston rod 21 is sheathed with a return spring 6.

When the solenoid valve is powered off, the sealing gasket is in contact with the sealing rib 41 under the action of the corresponding return spring 6 to close the first valve seat 4 and the second valve seat 5; when the solenoid valve is energized, the sealing gasket is separated from the sealing rib 41 under the action of the corresponding piston rod to open the first valve seat 4 and the second valve seat 5, and a spring force of the return spring 6 is 1.5 N; a tandem structure is adopted, the sealing gasket 22 is respectively driven to be opened by the independent first solenoid valve 2 and second solenoid valve 3, the sealing gasket 22 on the first solenoid valve 2 is configured to open or close the first valve seat 4, the sealing gasket on the second solenoid valve 3 is configured to open or close the second valve seat 5, and after the corresponding solenoid valve is powered off, the spring pushes the corresponding sealing gasket to move downward to block the valve seat, resulting in high degree of safety redundancy.

The fit between the sealing rib 41 and the sealing gasket results in good sealing performance, and the sealing rib 41 and the two inclined surfaces are not provided with any air holes, which will not affect the sealing performance and prevent the sealing gasket from being unable to be opened due to tar in easily residual gas; the sealing gasket is configured to open or close the valve seat; after the corresponding solenoid valve is powered off, the spring pushes the corresponding sealing gasket to move downward to block the valve seat, resulting in high degree of safety redundancy; the fit between the sealing rib and the sealing gasket results in good sealing performance.

The pressure plate is arranged on the sealing gasket, so that the acting force of the return spring acts on the pressure plate which is subject to uniform force, ensuring the sealing performance between the sealing gasket and the sealing rib, and avoiding an outer periphery of the sealing gasket from upwarping, which solves the problem of gas leakage caused by a gap between the sealing gasket and the valve seat as a result of downward depression of the middle portion and the upwarping of the outer periphery of the sealing gasket due to uneven direct force of the return spring on the sealing gasket in the prior art.

Meanwhile, the piston rod is movably connected with the sealing gasket, and the lower end face of the limiting block is arranged in the arc shape, which facilitate adjustment of the sealing gasket; when the sealing gasket moves towards the valve seat, a deviation will easily occur during movement of the sealing gasket due to the acting force of the return spring, failing to ensure complete sealing between the sealing gasket and the valve seat; therefore, the bottom of the limiting block is improved, so that the sealing gasket can be adjusted in real time, resulting in good sealing performance between the sealing gasket and the valve seat.

A positioning boss 225 is provided at the middle position of the sealing gasket 22, the pressure plate 23 is sheathed on an outer periphery of the positioning boss 225, and an annular sleeve 231 is provided on the pressure plate 23; the annular sleeve 231 has a small top and a large bottom, and an upper end face of the annular sleeve 231 is arranged lower than an upper end face of the positioning boss 225; the pressure plate 23 does not fully cover the sealing gasket 22, which facilitates the connection of the sealing gasket with the piston rod 21, but does not affect the action of the pressure plate on the sealing gasket; and the annular sleeve is arranged to have the small top and the large bottom to press the elastic piece inward to avoid the limiting block from being separated from the connecting cavity.

An inclined transition surface 224 is provided between an inner side wall of the movable cavity 222 and the elastic piece 221, the elastic piece 221 is arranged lower than an upper end face of the concave cavity; the movable cavity has a space for the piston rod to move, and there is a short contact surface between the piston rod and the elastic piece, which is convenient for angle adjustment of the piston rod relative to the sealing gasket; and a lower end portion of the return spring 6 is sheathed outside the annular sleeve 231, which results in good stability, so that the sealing gasket 22 is better driven to move downward to close the first valve seat 4 and the second valve seat 5.

The sealing gasket has a hardness of HS55 and a thickness of 3 mm, has good wear resistance, cutting resistance and compression resistance, can maintain its shape and performance well, reduce wear, and has a heat aging protection function, and will not rapidly age or deform due to temperature change in a high temperature environment. The sealing rib 41 has a width of 0.25 mm to 0.4 mm; too narrow sealing rib 41 can easily cause damage to the sealing gasket, and too wide sealing rib 41 will affect the sealing effect, therefore, the width of the sealing rib 41 is in the range of 0.25 mm to 0.4 mm, which will neither damage the sealing gasket nor affect the sealing effect.

The tandem gas valve further includes a silencing pad 7, where upper end faces of the two piston rods are respectively provided with an accommodating cavity 211, the silencing pad 7 is arranged in the accommodating cavity 211, a magnetic core 25 in fit with the accommodating cavity 211 is provided in the solenoid valve, and when the piston rod 21 is attracted under the action of an electromagnetic field force, the magnetic core is located in the accommodating cavity 211 and arranged to abut against the silencing pad 7, which plays a silencing role, and is also beneficial to improve the voltage released by the solenoid valve, resulting in high safety.

The tandem gas valve further includes a fixing seat 8 in sealing fit with the valve body 1, where the first solenoid valve 2 and the second solenoid valve 3 are fixedly arranged on the fixing seat 8 by bolts, a second opening 81 is provided on the fixing seat 8 at a position corresponding to the first opening 16, the piston rod passes in and out of the second opening 81, a sealing groove 17 is provided on an outer periphery of the valve body 1 located at the first opening 16, and a sealing ring 171 is provided in the sealing groove 17 to form the sealing fit between the valve body 1 and the fixing seat 8, which facilitates mounting of the solenoid valve and results in stable structure thereof, and the arrangement of the sealing groove 17 and the sealing ring 171 enables good sealing performance between the fixing seat 8 and the valve body 1, thus avoiding gas leakage.

A third sealing gasket 9 is provided between the solenoid valve and the fixing seat 8, a third through hole 91 is provided on the third sealing gasket 9 at a position corresponding to the second opening 81, positioning grooves 92 are provided on both opposite side edges of the third sealing gasket 9, positioning edges 26 are correspondingly provided on the solenoid valves, and the positioning edge 26 are located in the corresponding positioning grooves 92, which results in a tight structure between the solenoid valve and the fixing seat 8 and good sealing performance, thus avoiding gas leakage from the gap between the solenoid valve and the fixing seat 8; the end portion of the bolt passes through the solenoid valve and the third sealing gasket 9, and fits with the mounting hole on the fixing seat 8 to achieve fixed mounting; and the bolt passes through the third sealing gasket 9, so that the third sealing gasket 9 has a firm structure and good stability.

The tandem gas valve further includes a lower cap 10, where a lower end face of the valve body 1 is provided with a third opening 18 at a position corresponding to the third chamber 14, the lower cap 10 includes a connecting plate 101 and a tab 102, the connecting plate 101 is fixedly connected with the valve body 1 by a bolt, and a fourth sealing gasket 20 is provided between the lower cap 10 and an end face of the second opening 81, and the tab 102 extends through the third opening 18 into the third chamber 14; the third opening 18 is arranged to facilitate die-casting of the valve body 1; the tab 102 on the lower cap 10 extends into the third chamber 14, which can reduce volume of the third chamber 14 and is beneficial to reduce the gas stored in the third chamber 14; the fourth sealing gasket 20 is arranged between the lower cap 10 and the valve body 1, so that the third chamber 14 has good sealing performance, preventing gas from flowing out; the connecting plate 101 is fixedly connected with the valve body 1 by the bolt, so that the lower cap 10 is easy to be dismounted and mounted and has a firm structure; and an upper end face of the tab 102 is provided with an arc-shaped portion.

What is claimed is:

1. A tandem gas valve, comprising a valve body and two solenoid valves with identical structures, wherein an inlet passage, a first chamber, a second chamber, a third chamber and an outlet passage are successively provided on the valve body along a gas flow path, a first valve seat is provided between the first chamber and the second chamber, and a second valve seat is provided between the third chamber and the outlet passage;

upper ends of the first valve seat and the second valve seat are respectively provided with a sealing rib and inclined surfaces located at both sides of the sealing rib, an upper end face of the valve body is provided with first openings at positions corresponding to the first valve seat and the second valve seat, the two solenoid valves are arranged corresponding to the first openings;

a piston rod is movably provided in the two solenoid valves, an end portion of the piston rod is movably connected with a sealing gasket, and an upper end face of the sealing gasket is provided with a pressure plate;

a concave cavity is provided at a middle position of the sealing gasket;

an elastic piece with a hole in the middle is provided on an inner side wall of the concave cavity along a circumferential direction thereof, and the elastic piece divides the concave cavity into a movable cavity and a connecting cavity;

a lower end portion of the piston rod is provided with a limiting block which is limited to the connecting cavity, and a lower end face of the limiting block is arranged in an arc shape;

the piston rod is sheathed with a return spring; and when the two solenoid valves are powered off, the sealing gasket is in contact with the sealing rib under the action of the return spring to close the first valve seat and the second valve seat, and when the two solenoid valves are energized, the sealing gasket is separated from the sealing rib under the action of the piston rod to open the first valve seat and the second valve seat.

2. The tandem gas valve according to claim 1, wherein a positioning boss is provided at the middle position of the sealing gasket, the pressure plate is sheathed on an outer periphery of the positioning boss, an annular sleeve with a small top and a large bottom is provided on the pressure plate, and an upper end face of the annular sleeve is arranged lower than an upper end face of the positioning boss.

3. The tandem gas valve according to claim 2, wherein an inclined transition surface is provided between an inner side wall of the movable cavity and the elastic piece.

4. The tandem gas valve according to claim 2, wherein a lower end portion of the return spring is sheathed outside the annular sleeve.

5. The tandem gas valve according to claim 4, wherein the sealing rib has a width of 0.25 mm to 0.4 mm.

6. The tandem gas valve according to claim 4, further comprising a fixing seat in sealing fit with the valve body, wherein the two solenoid valves are fixedly arranged on the fixing seat by bolts, a second opening is provided on the fixing seat at a position corresponding to the first opening, the piston rod passes in and out of the second opening, a sealing groove is provided on an outer periphery of the valve body located at the first opening, and a sealing ring is provided in the sealing groove to form the sealing fit between the valve body and the fixing seat.

7. The tandem gas valve according to claim 6, wherein a third sealing gasket is provided between the two solenoid valves and the fixing seat, a third through hole is provided on the third sealing gasket at a position corresponding to the second opening, positioning grooves are provided on both opposite side edges of the third sealing gasket, positioning edges are correspondingly provided on the two solenoid valves, and the positioning edges are located in the corresponding positioning grooves.

8. The tandem gas valve according to claim 6, further comprising a lower cap, wherein a lower end face of the valve body is provided with a third opening at a position corresponding to the third chamber, the lower cap comprises a connecting plate and a tab, the connecting plate is fixedly connected with the valve body by a bolt, and a fourth sealing gasket is provided between the lower cap and an end face of the third opening, and the tab extends through the third opening into the third chamber.

9. The tandem gas valve according to claim 4, further comprising a silencing pad, wherein an upper end face of the piston rod is provided with an accommodating cavity, the silencing pad is arranged in the accommodating cavity, a magnetic core in fit with the accommodating cavity is provided in the two solenoid valves, and when the piston rod is attracted under the action of an electromagnetic field force, the magnetic core is located in the accommodating cavity and is arranged to abut against the silencing pad.

* * * * *